United States Patent
Laaser

(10) Patent No.: US 12,050,995 B2
(45) Date of Patent: *Jul. 30, 2024

(54) SYSTEM AND METHOD FOR INCREASING EFFICIENCY OF GRADIENT DESCENT WHILE TRAINING MACHINE-LEARNING MODELS

(71) Applicant: INTUIT INC., Mountain View, CA (US)

(72) Inventor: William T. Laaser, Mountain View, CA (US)

(73) Assignee: INTUIT INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/362,094

(22) Filed: Jul. 31, 2023

(65) Prior Publication Data

US 2023/0376764 A1    Nov. 23, 2023

Related U.S. Application Data

(63) Continuation of application No. 17/405,458, filed on Aug. 18, 2021, now Pat. No. 11,763,151, which is a continuation of application No. 15/971,490, filed on May 4, 2018, now Pat. No. 11,126,893.

(51) Int. Cl.
| | |
|---|---|
| G06N 5/02 | (2023.01) |
| G06F 17/11 | (2006.01) |
| G06F 18/21 | (2023.01) |
| G06F 18/214 | (2023.01) |
| G06N 3/08 | (2023.01) |
| G06N 20/00 | (2019.01) |

(52) U.S. Cl.
CPC ............... *G06N 3/08* (2013.01); *G06F 17/11* (2013.01); *G06F 18/2155* (2023.01); *G06F 18/217* (2023.01); *G06N 20/00* (2019.01)

(58) Field of Classification Search
CPC .......... G06N 3/08; G06N 20/00; G06N 3/048; G06N 7/01; G06N 20/10; G06F 17/11; G06F 18/2155; G06F 18/217

See application file for complete search history.

(56) References Cited

U.S. PATENT DOCUMENTS

| | | | | |
|---|---|---|---|---|
| 8,886,576 | B1 * | 11/2014 | Sanketi | G06N 20/00 706/47 |
| 2003/0105789 | A1 | 6/2003 | Walster et al. | |
| 2006/0041403 | A1 * | 2/2006 | Jaber | G06F 17/18 702/189 |

(Continued)

*Primary Examiner* — Howard D Brown, Jr.
(74) *Attorney, Agent, or Firm* — Patterson + Sheridan, LLP

(57) ABSTRACT

Systems and methods of the present disclosure provide processes for determining how much to adjust machine-learning parameter values in a direction of a gradient for gradient-descent steps in training processes for machine-learning models. Current parameter values of a machine-learning model are vector components that define an initial estimate for a local extremum of a cost function used to measure how well the machine-learning model performs. The initial estimate and the gradient of the cost function for the initial estimate are used to define an auxiliary function. A root estimate is determined for the auxiliary function of the gradient. The parameters are adjusted in the direction of the gradient by an amount specified by the root estimate.

17 Claims, 3 Drawing Sheets

(56) References Cited

U.S. PATENT DOCUMENTS

| | | | |
|---|---|---|---|
| 2009/0098828 A1* | 4/2009 | Furman | H04L 25/03038 |
| | | | 375/232 |
| 2015/0052091 A1 | 2/2015 | Jamali | |
| 2016/0078361 A1 | 3/2016 | Brueckner et al. | |
| 2017/0293894 A1 | 10/2017 | Taliwal et al. | |
| 2018/0293711 A1* | 10/2018 | Vogels | G06F 17/10 |
| 2019/0156240 A1 | 5/2019 | Ida et al. | |
| 2021/0183406 A1* | 6/2021 | Rogers | G16Y 20/10 |
| 2021/0383173 A1* | 12/2021 | Laaser | G06F 18/217 |
| 2023/0376764 A1* | 11/2023 | Laaser | G06F 18/217 |

\* cited by examiner

SYSTEM AND METHOD FOR INCREASING EFFICIENCY OF GRADIENT DESCENT WHILE TRAINING MACHINE-LEARNING MODELS

CROSS-REFERENCE TO RELATED APPLICATIONS

This application is a continuation of, and hereby claims priority under 35 U.S.C. § 120 to, co-pending U.S. patent application Ser. No. 17/405,458, filed Aug. 18, 2021, which is a continuation of U.S. Pat. No. 11,126,893, filed May 4, 2018, the contents of each of which are incorporated herein by reference in their entirety.

INTRODUCTION

Embodiments of the present invention generally relate to methods for training machine-learning models. Specifically, embodiments described herein describe methods for dynamically adjusting step sizes for gradient descent to streamline training processes for machine-learning models.

Machine-learning models allow computing systems to improve and refine functionality without explicitly being programmed. Given a set of training data, a machine-learning model can generate and refine a function that determines a target attribute value based on one or more input features. For example, if a set of input features describes an automobile and the target value is the automobile's gas mileage, a machine-learning model can be trained to predict gas mileage based on the input features, such as the automobile's weight, tire size, number of cylinders, and engine displacement.

The predictive accuracy a machine-learning model achieves ultimately depends on many factors. Ideally, training data for the machine-learning model should be representative of the population for which predictions are desired (e.g., unbiased and correctly labeled). In addition, training data should include a large number of training instances relative to the number of features on which predictions are based and relative to the range of possible values for each feature.

Different types of machine-learning models may be trained via different processes. Gradient descent is incorporated into the training processes for various machine-learning models, such as artificial neural networks. In gradient descent, one or more parameters that define a specific machine-learning model are iteratively adjusted to improve the model's performance, as measured by a cost function, on a given set of training data.

Many approaches for training machine-learning models use gradient descent to search for a local extremum (e.g., a local minimum) of a cost function that is used to measure how well a machine-learning model performs. In general, a cost function is a function whose domain comprises parameters of a machine-learning model. For example, biases and weights in the activation functions of nodes in an output layer of a neural network are parameters that help determine how well the neural network performs on a given set of training data, so a cost function that measures the performance of the neural network would be a function of those weights and biases.

In gradient descent, the gradient of the cost function at a particular point corresponding to the current parameter values for a machine-learning model is calculated (e.g., based on a single training instance in stochastic gradient descent or based on multiple training instances in batch gradient descent). To improve the performance of the machine-learning model, the parameter values are adjusted in a direction specified by the gradient. The amount of the adjustment to the parameters may be referred to as a learning rate or a step size. However, most techniques for training machine-learning models lack an intelligent, dynamic way to determine how far to move in the direction specified by the gradient to avoid overshooting local extrema, yet also ensure rapid convergence. As a result, most techniques for training machine-learning models use relatively small learning rates that gradually decrease at a predefined decay rate for each adjustment. Such techniques typically prevent overshooting. However, such techniques are also inefficient because a small learning rate often necessitates a large number of training iterations (e.g., epochs) to achieve convergence. This inefficiency increases the amount of time it takes to retrain a machine-learning model when updated training data becomes available.

Accordingly, better methods are needed for adjusting step sizes for gradient descent to streamline training processes for machine-learning models.

BRIEF SUMMARY

One embodiment of the present disclosure includes a system comprising one or more processors and memory storing one or more instructions that, when executed on the one or more processors, cause the system to: receive a set of training data comprising at least one training instance, wherein the training instance includes one or more input features; calculate a current output of the machine-learning model for the set of training data based on the one or more input features; determine a gradient for an initial estimate for a local extremum of the cost function, wherein parameter values of the machine-learning model are vector components of the initial estimate, and wherein a range value to which the cost function maps the initial estimate is based on a difference between the current output and a predefined target output for the set of training data; determine a root estimate for an auxiliary function of the gradient; and adjust the parameter values in a direction of the gradient by an amount specified by the root estimate to generate an updated estimate of the local extremum.

Another embodiment provides a computer-readable storage medium having instructions, which, when executed on a processor, perform an operation that generally includes: receiving a set of training data comprising at least one training instance, wherein the training instance includes one or more input features; calculating a current output of the machine-learning model for the set of training data based on the one or more input features; determining a gradient for an initial estimate for a local extremum of the cost function, wherein parameter values of the machine-learning model are vector components of the initial estimate, and wherein a range value to which the cost function maps the initial estimate is based on a difference between the current output and a predefined target output for the set of training data; determining a root estimate for an auxiliary function of the gradient; and adjusting the parameter values in a direction of the gradient by an amount specified by the root estimate to generate an updated estimate of the local extremum.

Another embodiment of the present disclosure includes a method that generally includes: receiving a set of training data comprising at least one training instance, wherein the training instance includes one or more input features; calculating a current output of the machine-learning model for the set of training data based on the one or more input features; determining a gradient for an initial estimate for a local extremum of the cost function, wherein parameter values of the machine-learning model are vector components of the initial estimate, and wherein a range value to which the cost function maps the initial estimate is based on a difference between the current output and a predefined target output for the set of training data; determining a root estimate for an auxiliary function of the gradient; and adjusting the parameter values in a direction of the gradient by an amount specified by the root estimate to generate an updated estimate of the local extremum.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Systems and methods of the present disclosure provide processes for determining how much to adjust machine-learning parameters in a direction of a gradient for gradient-descent steps in training processes for machine-learning models. As a result, the systems and methods disclosed herein reduce the expected number of gradient-descent steps it takes to achieve convergence to a local extremum during training, thereby reducing the overall amount of time it takes to train machine-learning models. In some embodiments, the systems and methods described herein reduce the problem of finding a local extremum of a multivariate function to the problem of finding a root of a function in a non-conventional way.

Figure 1:
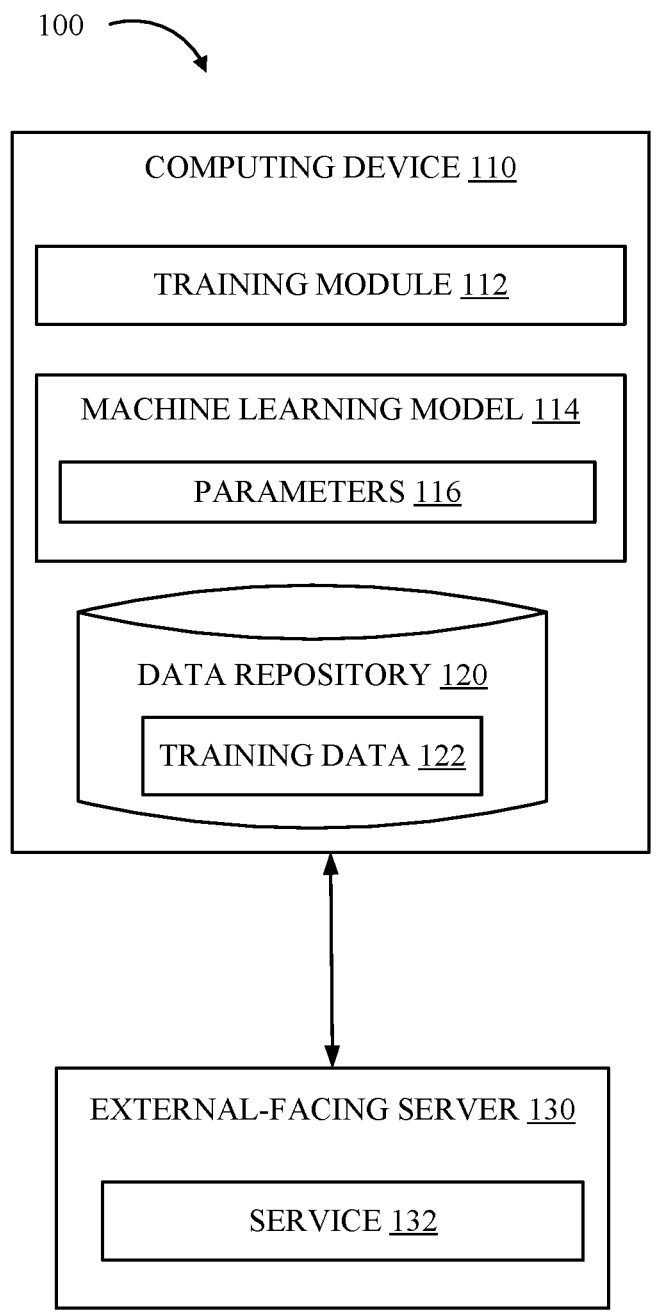
FIG. 1 illustrates a computing environment in which systems of the present disclosure may operate, according to one embodiment.

FIG. 1 illustrates a computing environment 100 in which systems of the present disclosure may operate, according to one embodiment. As shown, the computing environment 100 includes a computing device 110 and a data repository 120. The computing environment 100 may also include an external-facing server 130. While computing device 110 and external-facing server 130 are illustrated as individual units, persons of skill in the art will understand that the computing device 110 and the external-facing server 130 may represent processors, memory, and other hardware distributed across multiple machines and locations (e.g., in a cloud computing arrangement). Similarly, the data repository 120 may represent memory, storage, and cache resources distributed across multiple machines and locations.

The service 132 may be a web application or some other software service that employs predictive functionality of the machine-learning model 114 (e.g., to enhance the quality of experience (QoE) for consumers of the service 132, provide predictions or inferences, etc.). For example, if the service 132 provides streaming services for multimedia content, the service 132 may use the machine-learning model 114 to determine which content to recommend to different consumers based on viewing histories and user profiles. In another example, if the service 132 provides a disease prediction service, the service 132 may use the machine-learning model 114 to predict which diseases are likely to affect consumers based on medical histories, genetic data, and lifestyle data. In yet another example, the service 132 may use the machine-learning model 114 to predict classifications of financial transactions for a financial management or tax preparation application. In other examples, the service 132 may use the machine-learning model for some other type of task that involves making a prediction or an inference of an unknown quantity or characteristic based on a set of known attributes (e.g., features).

The service 132 may collect and send the training data 122 to the data repository 120, or the training data 122 may be received from another source. The training data 122 includes a collection of training instances. A training instance comprises a set (e.g., a vector) of input features and a target value. The target value is a label that the machine-learning model 114 is trained to infer based on the input features. Typically, the target value has been empirically verified for the training instance. For example, suppose the machine-learning model 114 is configured to predict an automobile's gas mileage based on input features that describe the automobile (e.g., weight, tire size, number of cylinders, engine displacement volume, make, model, model year, etc.). The actual gas mileage for the automobile may be empirically determined by driving the automobile and tracking the amount of gas consumed per mile driven on the average. The actual gas mileage, as determined, would be the label of a training instance that corresponds to the automobile.

In general, the number of input features in any particular training instance of the training data 122 should be small relative to the total number of training instances used to train the machine-learning model 114. In some embodiments, the number of features for each training instance can be at least three orders of magnitude smaller than the total number of training instances used to train the machine-learning model 114.

There are many different types of supervised machine-learning models that can be used for the machine-learning model 114. For example, the machine-learning model 114 may be a neural network, a support vector machine, a Bayesian belief network, a nearest-neighbor model (e.g., k-NN), a regression model, or a deep belief network, among others. The machine-learning model 114 may also be an ensemble of several different individual machine-learning models. Such an ensemble may be homogenous (i.e., using multiple member models of the same type) or non-homogenous (i.e., using multiple member models of different types). Individual machine-learning models within such an ensemble may all be trained using the same subset of the training data 122 or may be trained using overlapping or non-overlapping subsets randomly selected from the training data 122.

Regardless, the machine-learning model 114 includes parameters 116 that are used to determine the output of the machine-learning model 114 for each training instance based on the input features of the training instance. For example, if the machine-learning model 114 is a neural network, the number of hidden layers, the number of nodes in each layer (e.g., a hidden layer or the output layer), and the existence of recurrence relationships between layers can vary. Some of the parameters 116, such as weights and biases for the activation functions of each node of the machine-learning model 114, are designed to have their values refined through training.

Once the training data 122 has been stored in the data repository 120, the training module 112 trains the machine-learning model 114.

As above, in gradient descent, one or more parameters that define a specific machine-learning model are iteratively adjusted to improve the model's performance, as measured by a cost function, on a given set of training data. Thus, for each (or at least one) of the gradient descent steps in the training process, the training module 112 determines a current gradient for a cost function that measures the performance of the machine-learning model 114. The current gradient is the gradient at a current estimate of a local extremum of the cost function. The current values of the parameters 116 make up the current estimate. Next, the training module 112 generates an auxiliary function based on the current estimate and the current gradient.

The training module 112 applies a technique for finding a root of the auxiliary function that is relatively close to the current estimate for the extremum of the cost function. Upon finding an estimated root of the auxiliary function, the training module 112 adjusts the values of the parameters 116 in the direction of the gradient by an amount specified by the estimated root. In practice, this approach yields faster convergence to a local extremum of the cost function than approaches that use a static learning rate.

To further illustrate how the training module 112 can use an auxiliary function in this manner, one example embodiment is described in further detail below. However, persons of skill in the art will recognize that the auxiliary function may be defined in other ways.

In the example embodiment described below, the following notations are used. Scalar variable are represented by Latin letters, such as x, y, and z. Vector variables are represented by Latin letters with arrow accents, such as $\vec{x}$, $\vec{y}$, and $\vec{z}$. Components of a vector variable are represented using the same Latin letter as the respective vector without the arrow accent, but with a prescript indicating the component index, such as $_1x$, $_2x$, $_ix$, and $_1y$. Specific values for a scalar variable, a vector variable, or a component of a vector variable are represented by adding subscripts to the variables. For example, $x_0$, $x_n$, and $y_0$ are specific scalar values; $\vec{x}_0$, $\vec{x}_n$, and $\vec{y}_0$ are specific vector values; and $_1x_0$, $_1x_n$, and $_2y_0$ are components of specific vector values. Superscripts represent exponents.

Extrema of a cost function occur at points where the gradient of the cost function is zero. Thus, if the cost function is denoted as $f(\vec{x})$, then $\vec{x}_0$ is a root of $f$ if $f(\vec{x}_0) = \vec{0}$.

Newton's method of approximation of roots is a technique for finding a root of a scalar function that receives a scalar argument as input, where a root of a function is defined as an input value that will cause the function to evaluate to zero. The cost function, however, receives a vector as input. A vector-based version of Newton's method of approximation of roots can be used to find extrema of the cost function if the output of the cost function has the same dimensionality as the input. For example, if the initial estimate $\vec{x}_n$ for a local extremum of the cost function, a next estimate $\vec{x}_{n+1}$ for the local extremum can be calculated according to the equation:

$$\vec{x}_{n+1} = \vec{x}_n - J^{-1}(\vec{x}_n) f(\vec{x}_n)$$

In the equation above, where J is the Jacobian of $f$ defined as by the following:

$$J = \begin{vmatrix} \frac{\partial_1 f}{\partial_1 x} & \frac{\partial_1 f}{\partial_2 x} & \cdots & \frac{\partial_1 f}{\partial_n x} \\ \frac{\partial_2 f}{\partial_1 x} & \frac{\partial_2 f}{\partial_2 x} & \cdots & \frac{\partial_2 f}{\partial_n x} \\ \vdots & \vdots & \ddots & \vdots \\ \frac{\partial_n f}{\partial_1 x} & \frac{\partial_n f}{\partial_2 x} & \cdots & \frac{\partial_n f}{\partial_n x} \end{vmatrix}$$

Further, $J^{-1}(\vec{x}_n)$ is the inverse of the Jacobian evaluated at $\vec{x}_n$. In the context of this example, $\vec{x}_n$ is a vector that includes the current parameter values specifying the current point. However, one challenge inherent in using this technique to search for a local extremum is that inverting the Jacobian is both computationally expensive and numerically unstable. This challenge generally prevents the use of this technique in practice.

However, the problem of finding a better approximation for an extremum of the cost function can be transformed into the problem of finding the root of an auxiliary function g. In this example, suppose $\vec{x}_n$ corresponds to a point that is the current estimate for a local extremum of $f$. Also suppose that the gradient of $f$ at $\vec{x}_n$ is denoted by $\nabla f(\vec{x}_n)$. The training module 112 can generate an auxiliary function g according to the equation:

$$g(s) = f(\vec{x}_n + s \nabla f(\vec{x}_n))$$

In the equation above, s is a scalar argument and g provides scalar output. Given an estimate $s_0$ for a root of g, the training module 112 can find an updated estimate $s_1$ for the root of g by applying the following equation:

$$s_1 = s_0 - \frac{g(s_0)}{g'(s_0)}$$

Notably, the first derivative of g, denoted as g'(s), is defined by the following equation:

$$g'(s) = \nabla(f(\vec{x}_n + s \nabla f(\vec{x}_n))) \cdot f(\vec{x}_n)$$

Therefore, the following may be derived:

$$g'(0) = (\nabla f(\vec{x}_n))^2$$

and, if $s_0 = 0$, then the following can be derived:

$$s_1 = -\frac{f(\vec{x}_n)}{(\nabla f(\vec{x}_n))^2}$$

This expression for $s_1$ can be used to find a next estimate $\vec{x}_{n+1}$ for a local extremum of the cost function. The next estimate $\vec{x}_{n+1}$ lies along the line $\vec{x}_n + s \nabla f(\vec{x}_n)$ and is defined by the following equation:

$$\vec{x}_{n+1} = \vec{x}_n - \frac{f(\vec{x}_n)}{(\nabla f(\vec{x}_n))^2} \nabla f(\vec{x}_n)$$

The preceding equation can be applied to generate subsequent estimates until the magnitude of the gradient is approximately zero.

Once the magnitude of the gradient is approximately zero, the training module 112 may consider the training process for the machine-learning model 114 to be finished and deploy the machine-learning model to the external-facing server 130 for use by the service 132. When the service 132 receives a request to label a set of input features (i.e., a label request), the service 132 can apply the machine-learning model to the input features to determine a label and send the label in response to the request. For example, if the service 132 provides streaming services for multimedia content, the service 132 may determine which content to recommend to a consumer described by the input features. In another example, if the service 132 provides a disease prediction service, the service 132 may predict which diseases are likely to affect a consumers described by the features. In yet another example, if the service 132 provides a financial management service, the service 132 may predict whether a transaction is a business or personal expense. In other examples, the service 132 may use the machine-learning model to determine some other type of label based on the input features.

Figure 2:
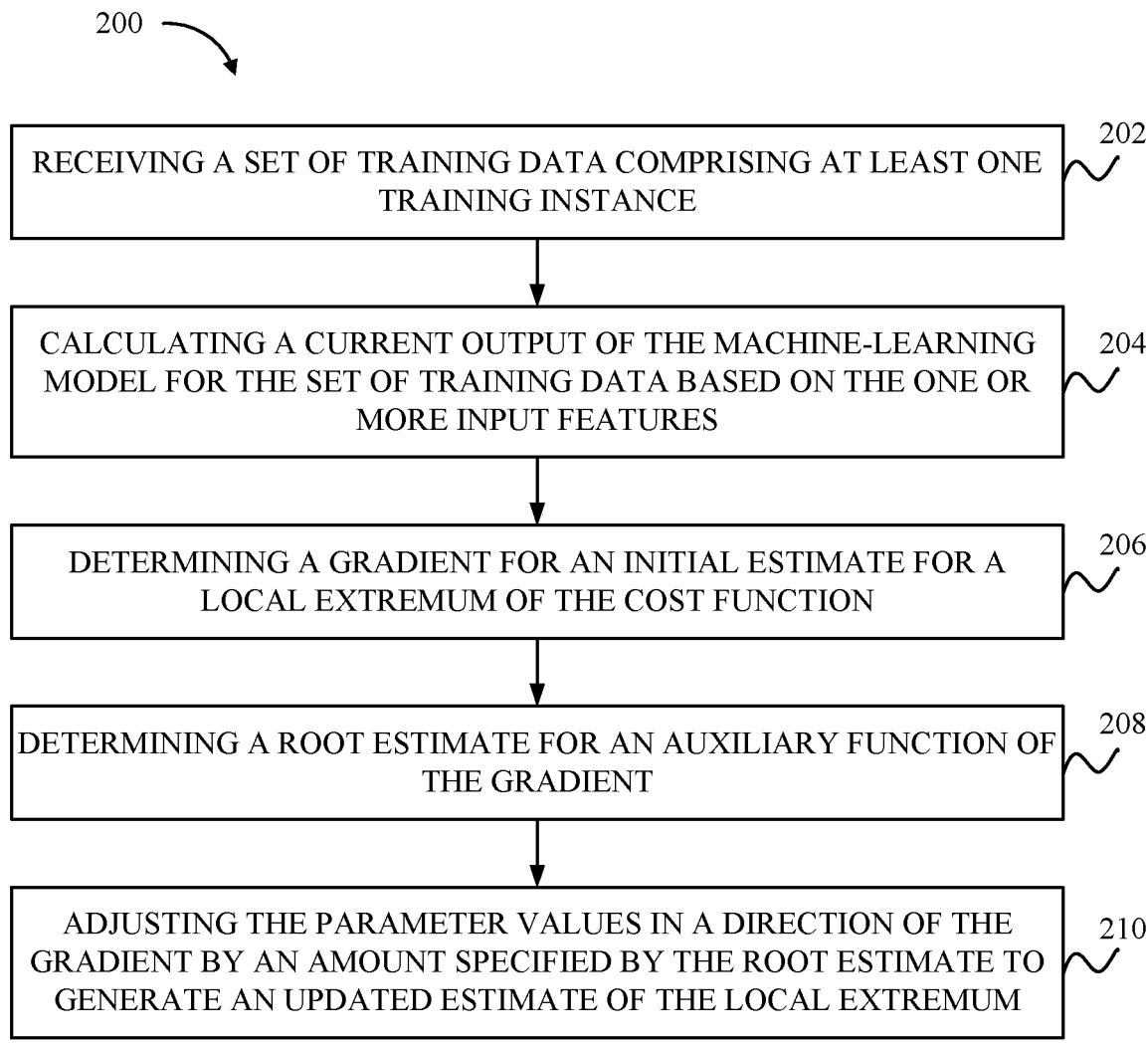
FIG. 2 is a flow diagram illustrating a process for training a machine-learning model, according to one embodiment.

FIG. 2 is a flow diagram illustrating a method 200 for training a machine-learning model, according to one embodiment. Method 200 may be implemented, for example, as instructions stored on a non-transitory computer-readable storage medium for execution by one or more processors of an apparatus.

At step 202, method 200 includes receiving a set of training data comprising at least one training instance. The training instance includes one or more input features.

At step 204, method 200 includes calculating a current output of the machine-learning model for the set of training data based on the one or more input features. The current output may comprise a label for the at least one training instance. The machine-learning model is a neural network, and wherein the parameter values comprise at least one weight and a bias.

At step 206, method 200 includes determining a gradient for an initial estimate for a local extremum of the cost function. Parameter values of the machine-learning model are vector components of the initial estimate. A range value to which the cost function maps the initial estimate is based on a difference between the current output and a predefined target output for the set of training data. For example, the range value may be a mean squared error, a cross-entropy cost, an exponential cost, a Hellinger distance, a Kullback-Leibler divergence, an Itakura-Saito distance, or some other measure of performance.

As step 208, method 200 includes determining a root estimate for an auxiliary function of the gradient. The auxiliary function may be defined by substituting a sum of initial estimate and a product of the gradient and the root estimate into the cost function in place of an argument for the initial estimate in a definition of the cost function.

At step 210, method 200 includes adjusting the parameter values in a direction of the gradient by an amount specified by the root estimate to generate an updated estimate of the local extremum. Adjusting the parameter values in the direction of the gradient may include, for example, squaring the gradient to determine a square; dividing the range value by the square to determine a quotient, or multiplying the quotient by the gradient to determine a product; and subtracting the product from the initial estimate to determine the second point.

Though not depicted in FIG. 2, method 200 may also include determining an updated gradient for the updated estimate. Further, method 200 may also include determining that a difference between a magnitude of the updated gradient and zero satisfies a predefined threshold condition. Finally, method 200 may include determining that the predefined threshold condition is satisfied and concluding the method.

In some further embodiments, method 200 may also include deploying the machine-learning model to an external-facing server. In such cases, method 200 may also include receiving, at the external-facing server via a network, a label request comprising input features of an additional instance not included in the training data. Further, method 200 may also include applying the machine-learning model to the input features of the additional instance to determine a label for the additional instance; and sending the label in response to the label request.

Method 200 improves on conventional machine learning techniques for training machine-learning models in that it provides an intelligent, dynamic way to determine how far to move in the direction specified by the gradient to avoid overshooting local extrema, yet also ensures rapid convergence. Thus, as compared to conventional techniques for training machine-learning models, which use relatively small learning rates that gradually decrease at a predefined decay rate for each adjustment, method 200 prevents overshooting local extrema while also reducing the number of training iterations (e.g., epochs) to achieve convergence. This improvement in efficiency decreases the amount of time it takes to retrain a machine-learning model when updated training data becomes available, which allows retraining of the machine-learning model more often, and which improves the performance of the underlying machine-learning model thereby. Further, by reducing the amount of time it takes to retain the machine-learning model, computing resources are saved. For example, fewer processing resources are necessary, which improves efficiency and availability of deployed computing resources, and reduces the cost associated with providing additional computing resources to handle the processing-intensive task of training models. Further, memory utilization is improved because memory is dedicated to retraining for a relatively lesser percentage of the time. These are just some examples of the improvements to performance attributable to method 200 as compared to conventional practices.

Figure 3:
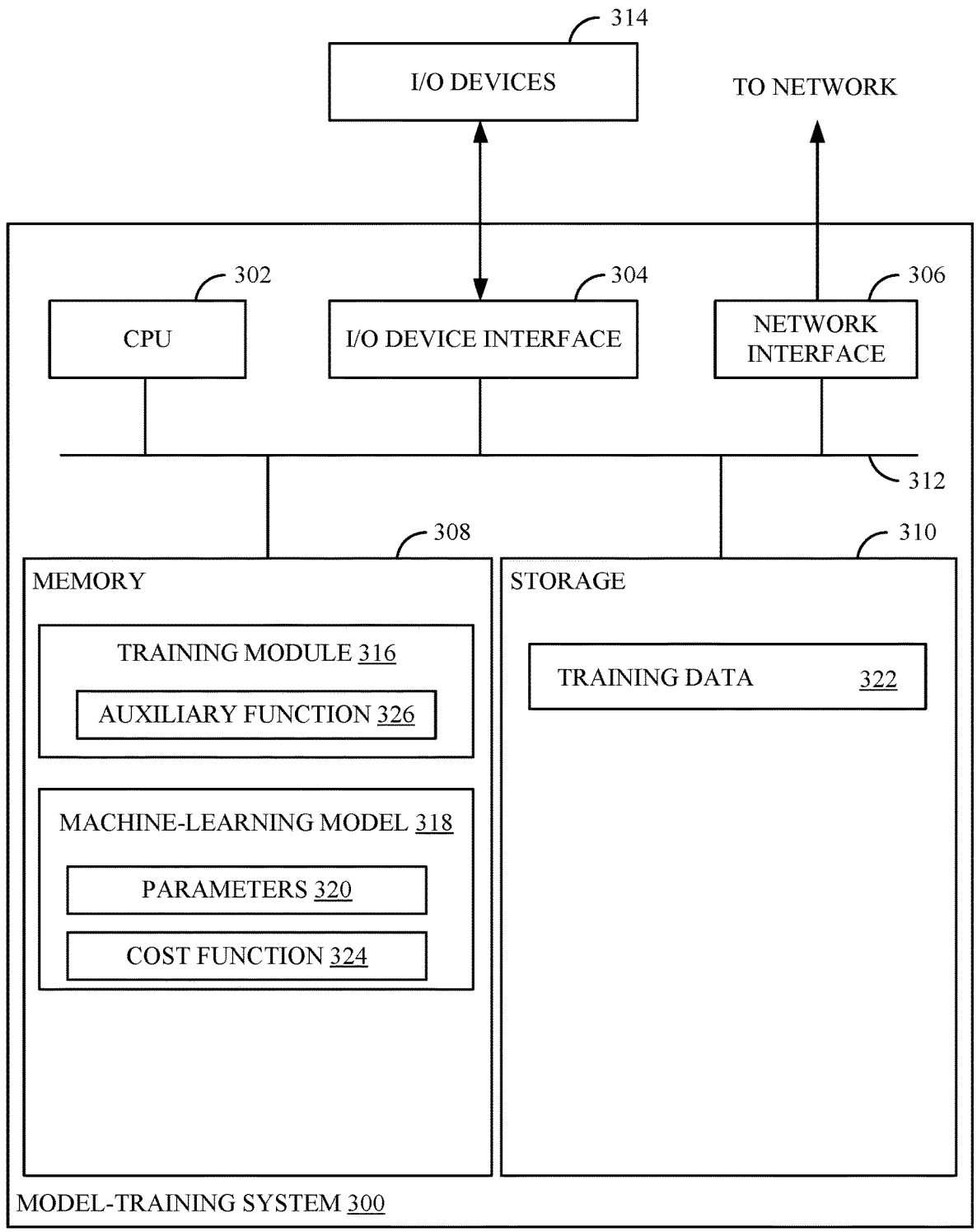
FIG. 3 illustrates a model-training system, according to an embodiment.

FIG. 3 illustrates a model-training system 300, according to an embodiment. As shown, the model-training system 300 includes a central processing unit (CPU) 302, at least one I/O device interface 304 which may allow for the connection of various I/O devices 314 (e.g., keyboards, displays, mouse devices, pen input, speakers, microphones, motion sensors, etc.) to the model-training system 300, network interface 306, a memory 308, storage 310, and an interconnect 312.

CPU 302 may retrieve and execute programming instructions stored in the memory 308. Similarly, the CPU 302 may retrieve and store application data residing in the memory 308. The interconnect 312 transmits programming instructions and application data, among the CPU 302, I/O device interface 304, network interface 306, memory 308, and storage 310. CPU 302 can represent a single CPU, multiple CPUs, a single CPU having multiple processing cores, and the like. Additionally, the memory 308 represents random access memory. Furthermore, the storage 310 may be a disk drive. Although shown as a single unit, the storage 310 may be a combination of fixed or removable storage devices, such as fixed disc drives, removable memory cards or optical storage, network attached storage (NAS), or a storage area-network (SAN).

As shown, memory 308 includes training module 316 and a machine-learning model 318. Storage 310 includes training data 322.

In some embodiments, training module 316 of model-training system 300 trains the machine-learning model 318 using the training data 322. For each (or at least one) gradient-descent step in the training process, the training module 316 determines a current gradient at a current estimate for a local extremum of a cost function 324 that measures the performance of the machine-learning model 318. The current values of the parameters 320 are components of a vector that is the current estimate. Next, the training module 316 generates an auxiliary function 326 based on the current estimate and the current gradient.

The training module 316 applies a technique for finding an estimate for a root of the auxiliary function that is relatively close to the current estimate for the extremum of the cost function. Upon finding an estimated root of the auxiliary function, the training module 316 adjusts the values of the parameters 320 in the direction of the gradient by an amount specified by the estimated root. The training module 316 can calculate an updated gradient after the parameters are adjusted and repeat the process until the parameters 320 converge to the local extremum.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be a graphics processing unit (GPU). A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for training a machine-learning model, comprising:
   receiving a set of training data comprising one or more input features;
   receiving an output of a machine-learning model for the set of training data based on the one or more input features;
   determining a gradient for an initial estimate for a local extremum of a cost function based on a difference between the output and a target for the set of training data;
   determining a root estimate for an auxiliary function of the gradient; and
   adjusting parameter values of the machine-learning model in a direction of the gradient by an amount specified by the root estimate to generate an updated estimate of the local extremum, wherein adjusting the parameter values of the machine-learning model in the direction of the gradient is based on squaring the gradient, wherein adjusting the parameter values in the direction of the gradient comprises an equation $$\vec{x}_{n+1} = \vec{x}_n - \frac{f(\vec{x}_n)}{(\nabla f(\vec{x}_n))^2} \nabla f(\vec{x}_n),$$

wherein $\vec{x}_n$ corresponds to an initial parameter value, $f(\vec{x}_n)$ corresponds to a range value, $\nabla f(\vec{x}_n)$ corresponds to the gradient and $\vec{x}_{n+1}$ corresponds to an adjusted parameter value.

2. The method of claim 1, wherein the auxiliary function is defined by substituting a sum of the initial estimate and a product of the gradient and the root estimate into the cost function in place of an argument for the initial estimate in a definition of the cost function.

3. The method of claim 1, wherein adjusting the parameter values in the direction of the gradient comprises:
   dividing a range value to which the cost function maps the initial estimate by a square of the gradient to determine a quotient;
   multiplying the quotient by the gradient to determine a product; and
   subtracting the product from the initial estimate to determine a second estimate.

4. The method of claim 1, further comprising:
   determining an updated gradient for the updated estimate;
   determining that a difference between a magnitude of the updated gradient and zero satisfies a predefined threshold condition; and
   concluding a training process for the machine-learning model based on the determination that the predefined threshold condition is satisfied.

5. The method of claim 1, further comprising:
   deploying the machine-learning model to an external-facing server;
   receiving, at the external-facing server via a network, a label request comprising input features of an additional instance not included in the set of training data;
   applying the machine-learning model to the input features of the additional instance to determine a label for the additional instance; and
   sending the label in response to the label request.

6. The method of claim 1, wherein calculating the output of the machine-learning model for the set of training data based on the one or more input features comprises determining a label for a training instance in the set of training data.

7. A system comprising:
   one or more processors; and
   memory comprising instructions that, when executed by the one or more processors, cause the system to:

receive a set of training data comprising one or more input features;

receive an output of a machine-learning model for the set of training data based on the one or more input features;

determine a gradient for an initial estimate for a local extremum of a cost function based on a difference between the output and a target for the set of training data;

determine a root estimate for an auxiliary function of the gradient; and adjust parameter values of the machine-learning model in a direction of the gradient by an amount specified by the root estimate to generate an updated estimate of the local extremum, wherein adjusting the parameter values of the machine-learning model in the direction of the gradient is based on squaring the gradient, wherein adjusting the parameter values in the direction of the gradient comprises an equation $$\vec{x}_{n+1} = \vec{x}_n - \frac{f(\vec{x}_n)}{(\nabla f(\vec{x}_n))^2} \nabla f(\vec{x}_n),$$

wherein $\vec{x}_n$ corresponds to an initial parameter value, $f(\vec{x}_n)$ corresponds to a range value, $\nabla f(\vec{x}_n)$ corresponds to the gradient and $\vec{x}_{n+1}$ corresponds to an adjusted parameter value.

8. The system of claim 7, wherein the auxiliary function is a defined by substituting a sum of the initial estimate and a product of the gradient and the root estimate into the cost function in place of an argument for the initial estimate in a definition of the cost function.

9. The system of claim 7, wherein adjusting the parameter values in the direction of the gradient comprises:
dividing a range value to which the cost function maps the initial estimate by a square of the gradient to determine a quotient;
multiplying the quotient by the gradient to determine a product; and
subtracting the product from the initial estimate to determine a second estimate.

10. The system of claim 7, wherein the instructions, when executed on the one or more processors, further cause the system to:
determine an updated gradient for the updated estimate;
determine that a difference between a magnitude of the updated gradient and zero satisfies a predefined threshold condition; and
conclude a training process for the machine-learning model based on determining that the predefined threshold condition is satisfied.

11. The system of claim 7, wherein the instructions, when executed on the one or more processors, further cause the system to deploy the machine-learning model to an external-facing server.

12. The system of claim 11, wherein the instructions, when executed on the one or more processors, further cause the system to:
receive, at the external-facing server via a network, an label request comprising input features of an additional instance not included in the set of training data;
apply the machine-learning model to the input features of the additional instance to determine a label for the additional instance; and
send the label in response to the label request.

13. A method for training a machine learning model, comprising:

receiving a set of training data comprising one or more input features;

receiving an output of a machine-learning model for the set of training data based on the one or more input features;

determining a gradient for an initial estimate for a local extremum of a cost function based on a difference between the output and a target for the set of training data;

determining a root estimate for an auxiliary function of the gradient; and adjusting parameter values of the machine learning model in a direction of the gradient by an amount specified by the root estimate to generate an updated estimate of the local extremum, wherein adjusting the parameter values of the machine learning model in the direction of the gradient is based on dividing a range value to which the cost function maps the initial estimate by a square of the gradient, wherein adjusting the parameter values in the direction of the gradient comprises an equation $$\vec{x}_{n+1} = \vec{x}_n - \frac{f(\vec{x}_n)}{(\nabla f(\vec{x}_n))^2} \nabla f(\vec{x}_n),$$

wherein $\vec{x}_n$ corresponds to an initial parameter value, $f(\vec{x}_n)$ corresponds to the range value, $\nabla f(\vec{x}_n)$ corresponds to the gradient and $\vec{x}_{n+1}$ corresponds to an adjusted parameter value.

14. The method of claim 13, wherein the auxiliary function is defined by substituting a sum of the initial estimate and a product of the gradient and the root estimate into the cost function in place of an argument for the initial estimate in a definition of the cost function.

15. The method of claim 13, further comprising:
determining an updated gradient for the updated estimate;
determining that a difference between a magnitude of the updated gradient and zero satisfies a predefined threshold condition; and
concluding a training process for the machine-learning model based on the determination that the predefined threshold condition is satisfied.

16. The method of claim 13, further comprising:
deploying the machine-learning model to an external-facing server;
receiving, at the external-facing server via a network, a label request comprising input features of an additional instance not included in the set of training data;
applying the machine-learning model to the input features of the additional instance to determine a label for the additional instance; and
sending the label in response to the label request.

17. The method of claim 13, wherein calculating the output of the machine-learning model for the set of training data based on the one or more input features comprises determining a current label for a training instance in the set of training data.

* * * * *